(12) United States Patent
Álvarez

(10) Patent No.: US 8,939,333 B2
(45) Date of Patent: Jan. 27, 2015

(54) WRIST HOLDER FOR TRANSPORTING AND USING ELECTRONIC DEVICES, WITH ANTI-ELECTROMAGNETIC RADIATION PROTECTION

(76) Inventor: Óscar Sevilla Álvarez, Madrid (ES)

( * ) Notice: Subject to any disclaimer, the term of this patent is extended or adjusted under 35 U.S.C. 154(b) by 281 days.

(21) Appl. No.: 13/147,365

(22) PCT Filed: Feb. 2, 2009

(86) PCT No.: PCT/ES2009/000053
§ 371 (c)(1),
(2), (4) Date: Aug. 1, 2011

(87) PCT Pub. No.: WO2010/086467
PCT Pub. Date: Aug. 5, 2010

(65) Prior Publication Data
US 2013/0087593 A1    Apr. 11, 2013

(51) Int. Cl.
| A45F 5/00 | (2006.01) |
| A45C 13/30 | (2006.01) |
| A45C 15/00 | (2006.01) |
| A01K 97/04 | (2006.01) |
| H04B 1/38 | (2006.01) |

(52) U.S. Cl.
CPC ............... *A45F 5/00* (2013.01); *H04B 1/3838* (2013.01); *H04B 1/385* (2013.01); *Y10S 224/93* (2013.01)
USPC .......... 224/219; 224/218; 224/222; 224/272; 224/576; 224/197; 224/930

(58) Field of Classification Search
USPC ......... 224/219, 576, 218, 197, 221, 272, 269, 224/249
See application file for complete search history.

(56) References Cited

U.S. PATENT DOCUMENTS

| 2,383,207 | A | * | 8/1945 | Morrell | 221/36 |
| 5,412,545 | A | * | 5/1995 | Rising | 362/105 |
| 6,360,928 | B1 | * | 3/2002 | Russo | 224/218 |
| 6,530,509 | B1 | * | 3/2003 | Davis | 224/219 |
| 6,581,770 | B1 | * | 6/2003 | Gheblikian | 206/425 |
| 6,648,130 | B1 | * | 11/2003 | Hasson et al. | 206/0.7 |
| 6,726,070 | B2 | * | 4/2004 | Lautner | 224/221 |
| 6,752,299 | B2 | * | 6/2004 | Shetler et al. | 224/197 |
| 6,926,146 | B2 | * | 8/2005 | Gheblikian | 206/425 |
| 7,424,110 | B1 | * | 9/2008 | Whiten, III | 379/454 |
| 7,529,155 | B2 | * | 5/2009 | Fasciano | 368/10 |
| 7,942,293 | B2 | * | 5/2011 | Lawrence et al. | 224/218 |
| 8,020,694 | B2 | * | 9/2011 | Hasson et al. | 206/0.7 |
| 8,328,055 | B1 | * | 12/2012 | Snyder | 224/197 |

(Continued)

FOREIGN PATENT DOCUMENTS

| CN | 2664301 Y | 12/2004 | |
| DE | 20316402 U1 | 9/2004 | |
| DE | 102006010492 A1 | 9/2007 | |
| DE | 102006010492 A1 * | 9/2007 | ............. H04M 1/21 |
| JP | 9130461 A | 5/1997 | |

(Continued)

*Primary Examiner* — Justin Larson
*Assistant Examiner* — Lester L Vanterpool

(57) ABSTRACT

It comprises a hollow box with openings for permitting operate most of its functions while the device is inside, open by one of its sides for introducing the device, an oscillating piece for closing the case, a pair of belts, a quick coupling system to connect the case and its base by way of a circular coupling that is part of the base, which will be attached to the wrist of the user, having in between an anti-radiation protection. Furthermore is suitable for devices with or without cover, in this latter case the openings are designed to be watertight by assembling some elements on them.

10 Claims, 5 Drawing Sheets

(56) References Cited

U.S. PATENT DOCUMENTS

Figure 1:
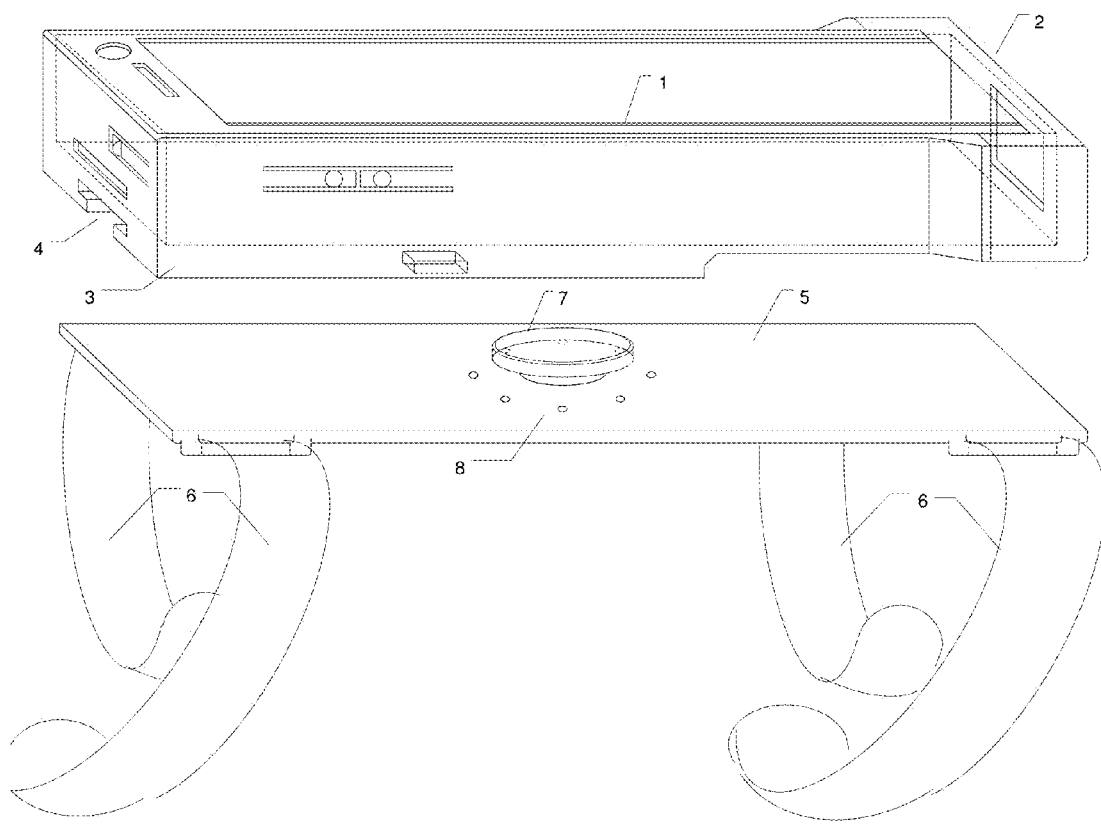

| | | | |
|---|---|---|---|
| 8,517,233 B2* | 8/2013 | Podda-Heubach | 224/183 |
| 2003/0222109 A1* | 12/2003 | Weiss | 224/222 |
| 2009/0321483 A1* | 12/2009 | Froloff | 224/267 |
| 2010/0327030 A1* | 12/2010 | Yang | 224/199 |
| 2012/0080462 A1* | 4/2012 | Hajarian | 224/219 |

FOREIGN PATENT DOCUMENTS

| | | | | |
|---|---|---|---|---|
| JP | 2002344590 A | | 11/2002 | |
| JP | 2002344590 A | * | 11/2002 | H04M 1/02 |
| JP | 2004320193 A | * | 11/2004 | H04M 1/02 |
| JP | 2004320193 A | | 11/2004 | |
| KR | 20050014543 A | | 3/2005 | |

* cited by examiner

WRIST HOLDER FOR TRANSPORTING AND USING ELECTRONIC DEVICES, WITH ANTI-ELECTROMAGNETIC RADIATION PROTECTION

BRIEF SUMMARY OF THE INVENTION

The invention refers to a wrist holder for the transport and use of electronic devices thus providing a quick access to the device. It comprises a hollow box with openings where the device will be carried protecting it from minor knocks, a moveable closing piece in one of the ends of the hollow box, a coupling area that allows easily to anchor the hollow box to the base and also securely but quickly to uncoupling from it. In addition the base will be attached to the wrist of the user, having in between an anti-radiation protection. Furthermore is suitable for devices with or without cover, in this latter case the hollow box is designed to be watertight. It is particularly suitable for communicating, processing and data storing devices, such as mobile telephones, PDAs, smart phones, microcomputers, GPS systems, external hard drives, electronic storing memory devices, audio and/or video players, medical devices for control or medication, and in general, for whichever device that, upon being carried on the user's wrist, may be considered as useful or comfortable for the purpose.

PRIOR ART

At present, there is a wide variety of cases, holders and the like for the transportation of devices, mainly cell phones, and in a smaller degree, other manually handled electronic devices of a relative low weight.

Some solutions, like plastic or leather cases, may protect the device on all its sides, but do not allow for quick access. Nor do they render the device manageable, unless completely out of the case.

Others consist in a belt case which allows for its quick location and might be comfortably transported, but do not allow for an easy handling of the device, unless completely out of the case.

Still others may be of the necklace type, easy to reach, but uncomfortable to carry, due to the swinging and uncomfortable movement of the device, which also leaves it completely unprotected.

Yet the most usual practice is to carry it without any kind of case whatsoever, directly in pants pockets, too close to the genital area, thus becoming a risk for being permanently exposed to radiation, or too difficult to locate inside a handbag with no quick access to it.

It is also worth-noting that thanks to the growing features offered by the mobile phone services, as well as the new needs demanded by the phone users, new devices have been launched into the market, the keyboards of which are no longer vertical but horizontal, and in many cases accessible only by lifting or sliding a part of the device which also functions as its cover or lid. This has not actually affected the current solutions, inasmuch as they served the purpose of being plain containers of the device while it is closed and not in use. Therefore, none of the above-mentioned allows for the use of such a keyboard, except for the hanging type which, as we have seen, has the disadvantage of the continuous swinging and lack of protection.

INVENTION DESCRIPTION

This invention is meant to comprise the following goals:
To keep away the device, electromagnetic wave-transmitter-receiver, from the genital area, around which it used to be transported.
To protect the new permanent contact area from radiation.
To allow for an exceptionally fast access to the device.
To allow for the control and functioning of the device while being transported, as well as the use of its main elements such as touch screens, keys and connectors.
Easy transportation of the device.
A swift and easy opening of the device's cover, provided there is one.
To enable the easy setup of hands-free conversations. Regarding this, one of the advantages of the aspects embodied in the invention, (provided that the device offers this among its speaker functions), is the possibility of establishing hands-free conversations without the need of a car support, or the use of hands to secure the device while walking and without the need of any other external devices, like the ones currently installed in cars for controlling speakers, microphones and voice recognition for dialing (inasmuch as the device offers this possibility).
To enable the easy setup of discreet mode conversations. You can achieve this by connecting a hands-free system consisting of a headset and microphone. However, given that not everybody owns one or likes this alternative, we brought forward the idea of a more traditional system, which consists in drawing the invention near the mouth and ear. It is possible to set the holder in place above or under the wrist and then bring it close to the ear. On the assumption that this posture is not comfortable for some people, we brought forward this new goal:
A swift and easy detachment of the device from the wrist, if needed. Likewise, for the user who prefers the alternative of taking the call this way, to allow for an automatic reattachment of the device just by placing it on the wrist, without pressing any buttons.
To take advantage of the new function of some devices that allows the user to read the screen vertically or horizontally. The idea is that without actually removing the device from the case, it can be rotated at 360°, thus providing reference positions at all angles multiple of 45°.
The mechanism to insert or remove the device from the holder must be comfortable, easy and elegant.
To guarantee the protection of the device against minor damages, mainly on the edges.
To offer a wrist attachment so as to prevent uncontrollable or irritating movements.

TECHNICAL DIFFICULTIES

The real challenge of this invention would be to make people in general just as acquainted with wearing an electronic device on the wrist as with wearing a watch. To achieve this goal we must present a practical, useful, attractive and economic design. This raises a number of problems:
 1. Dimensions. Using any shell might mean increasing the size of the electronic device, so the challenge here lies in assuring a comfortable use of the device by users wearing long sleeves.
 2. Weight. Using any shell might mean increasing the weight of the electronic device, so the challenge here lies in making the pieces as robust and as thin as possible, while not using heavy materials.
3. The mechanism for the insertion and removing of the device must be activated by one hand.
4. While comfortable, the insertion and removing mechanism must be safe and designed to prevent that an accidental hit allows release of the device. The overly fast insertion or removing of the device is not required.
5. The insertion and removing mechanism must be activated by one hand.
6. The mechanism for the removing of the device from the wrist area must be exceptionally fast, and activated by a movement included in the sequence required to take the phone and answer a call. Likewise, it must be reliable, namely to avoid an accidental activation of the whole mechanism. In this case, swiftness outweighs security, while in considering the mechanism for the insertion and removing of the device, security outweighs swiftness. Hence, the need for two different mechanisms.
7. The wrist attachment must allow for large variations in order for the user to adapt to different wrist sizes, and given that there is an unusual additional weight on this area, at the same time it must render a precise adjustment to the desired size.

DESCRIPTION AND SOLUTIONS

By means of two pairs of belts a base is attached to the wrist of the user. Such a base has a circular coupling on its approximate geometric center, rising as a protuberance which, as seen from above, presents itself as a circular shape, while from a lateral view takes a mushroom-like shape. That is to say, a stem that connects the base with a flat circular surface placed above the stem, with a slightly bigger radius than the stem itself. From now on, we will refer to this wider piece of the circular coupling as "mushroom head". Both pairs of belts are similar to those of a watch, with the difference that ours will use hook and loop material instead of punctures, in order to the user can adjust more precisely the desired clearance. The use of two pairs of belts, instead of one, offers effective restraint to avoid uncontrolled movements.

The belts will be attached to the base by means of couplings, which will be located in pairs in each longitudinal side of the base if such base is rectangular, or in symmetrical pairs in case it is not. There may be retractable metallic seatings, similar to the ones used for watches, built into the couplings. In any case, the function of the couplings is to secure the belts with the seatings, or by any other means.

The dimensions and shape of the base will be similar to those projected by the device when it is seen from a plan view and when it is securely placed in such a way that its main control components are placed facing up and to the sides. Thus, if the bottom side of the devise is flat or almost flat, the holder base will be flat. On the other hand, if the bottom side of the device is curved, the holder base may have the same curvature, or another a similar one, provided it better fits the wrist's natural shape.

Therefore, the holder base will be flat and rectangular for the vast majority of the devices.

The circular coupling's shape is the main feature that allows the following functionalities: 1) the joining between the base and the basket that shelters the device. 2) The easy rotation of the basket that shelters the device, while both keep anchored to the base.

The base and circular coupling are two parts hypothetically divided from a single real piece. It actually comprises three parts: The first one is made of polycarbonate and offers the circular coupling and the usual rectangular base. However, the surface of its bottom side presents a carved shape, with the exception of a peripheral edge which allows placing a 1.4310-type thin stainless steel sheet in the carved space, which in turn will be sandwiched with another polycarbonate sheet to be joined to the first piece edge by ultrasounds or termsealing.

The base securing the belts offers the anti-radiation protection in the horizontal plane, being placed between the user's wrist and the device. Care has been taken to guarantee that such protection is an effective barrier to the wrist (this being the permanent area in close contact with the device). However, the protection must be slightly separated from the device and in a single plane in case this device were a telecommunication gadget, and in which case if it was too much isolated, it would emit with more power to ensure the communication with the base station. This would produce an effect opposite to the one desired, not to mention an increment of the battery consumption. Likewise, if the anti-radiation protection were completely surrounding the device, it could not be connected to any network.

The anti-radiation protection is in the base's interior and comprises a type of stainless metal sheet without fissures, joints or welding like can be 1.4310 stainless steel.

The base's circular coupling will serve to anchor it to the other main element of the invention, a normally rigid shell that will shelter the electronic device we want to transport. Even though this shell is an assembled element that is handled as a single piece, it is possible to notice two parts or elevations. The upper part is a kind of basket that will lodge the electronic device, and the bottom part is the one responsible for the mechanism that couples and uncouples the bases' circular coupling.

The coupling process is achieved by sliding the base's circular coupling through a slit located in the bottom part of the shell. In order to slid in the base's circular coupling it will be enough to place the shell parallel to the base, and introducing the circular coupling's side all the way through to the end of its path when a double click is produced once the coupling system is engaged.

The coupling system comprises two sets of symmetrical pieces, one on each side of the slit into which the circular coupling clasps. These sets of pieces will operate on the mushroom head. Each set of pieces comprises:

An elongated piece with a turning point that enables it to tilt. From now on we will refer to this piece as "the coupling piece". One end of this piece ends up as a small rectangular button that protrudes from the shell by a wall opening, so that it can be activated by the user. The other end has an arched shape. In standstill position, this piece would avoid the accidental sliding off of the coupling from the slit.
  A torsion spring that forces the coupling piece into a standstill position.
  A large protrusion which reduces the coupling piece's spin range for:—setting the standstill position when the coupling piece is not actuated by the user—or for setting the maximum spin, when it is actuated.

The coupling system works as follows: let us say that the base and the basket are separated and we wish to join them. By bringing and sliding the circular coupling into the slit, the former should find in its way one extreme of the coupling piece and that upon being pushed makes tip the whole coupling piece, thus overcoming the moderate resistance of the torsion spring, until the circular coupling reach the furthermost part of the trail path. Precisely, by clasping into the position at the end of the trail, the mushroom head allows the curved part of the coupling piece to tip back into its standstill position and end up again on the path of the mushroom head, but this time, and due to the angle of the coupling piece in its standstill position, prevents the circular coupling from starting its way out of the rail, thus remaining safely anchored, without the need of pressing any button.

It is worth noting that this is a two-fold process since there is an identical set of pieces on each side of the rail. The reason for this is to avoid that an undesired pressure or an accidental hit on a button may actuate the uncoupling mechanism.

The unclasping process can only be initiated when the user presses the buttons that protrude from the two longitudinal sides of the shell's middle part. These buttons will retract slightly into the shell to a top, enabling the user to slide out the shell in order to allow the circular coupling to exit the rail through the same path it came in.

The base has a series of small carvings located around the circular coupling. Even though the system's rotation is free at 360 degrees, such carvings and protrusions allow for fixing the rotation to angles multiple of 45°.

The area intended to place the coupling mechanism does not take the entire surface between the base and the basket, leaving an empty area that is not used or covered but let free, and in discontinuity between the base and the basket.

The area intended to place the coupling mechanism only occupies half, or less, of the surface between the base and the basket, leaving empty the rest that is not used or covered, but let free and in vertical discontinuity with the base and the basket, pursuing a twofold goal. On the one hand, this generates an empty space between the inner antenna of any telephony device and the base with the anti-radiation protection. This allows for the anti-radiation protection without hindering the communication. On the other hand, it creates an empty space to dissipate the heat usually generated by electronic devices, mainly the battery. And last but not least, it creates an empty space to be adjusted in the shirt cuff or another garment in case that its looseness is not enough to cover the entire holder.

The basket that will shelter the device is on the top side. It usually is a rectangular, low hollow box, lacking one of the transverse walls in order to create a space for inserting and extracting the device. On this end will be attached another moveable piece that will close the basket allowing to host and transport the device. From now on we will refer to this piece as "closing piece". The box has other openings, but none of them big enough for the device to be extracted. The biggest of these openings is on the upper face of the basket, completely open, but for a small ledge that extends along the entire perimeter. The following openings are intended for the activation and access of keys, speakers, cameras, ports, or any other device's elements the access of which is possible and practical through an opening. Therefore, the amount and location of such openings will vary depending on the model of the device.

The process for the insertion and extraction of the device is as follows: Assuming that the holder is closed in the horizontal plane (regardless of whether it is anchored to the base and both over the user's wrist, or not) hold it with a finger on each side of the closing piece and pull it up in a vertical plane all the way up until being locked up from the top. This way, the closing stem is freed, at which point the traction of the piece is carried on, now in a horizontal plane and outward, all the way until being locked against another top. At this point, the closing piece is rotated downward until its wall, previously in a vertical position, is hidden and placed horizontally in the cavity between the basket and the base. In this position, the closing piece's structure has retrieved all its parts from the way to enable the extraction of the device from the holder, and thanks to its shape, it also functions as a guide to facilitate the process. Once the user has completely introduced or extracted the device, the process to re-close the holder is the same but the other way around, namely, to rotate the closing piece upward until achieving a vertical position, push it in the horizontal plane until coming across the top, and finally lower the piece in the vertical plane all the way to the end.

The system to insert and extract the device has certain elements in the basket and others in the moveable closing piece. In the basket, it is worth-noting, there is an outward widening on each longitudinal wall precisely on the open end of the basket. Each widening has two slits, one is an L-shaped slit, rotated 90 degrees and with no exit points on its path; this will be "the rotating rail". The other one is a vertical slit, with an open end on its upper side and a closed end-trail. This will be the "closing rail". These widenings, and the walls they are part of, have a clipping on their shapes, leaving a portion of the device visible and accessible to traction when it is in the holder. Attached to the closing piece is a thin elastic layer, all around the contour, that prevents liquid penetration once the piece is fitted into the basket.

DRAWING DESCRIPTIONS

FIG. 1. Drawing in 3D of the whole wrist holder for the transportation of devices. The shell and base can be seen, separately, without anti-rain protection.

Figure 2:
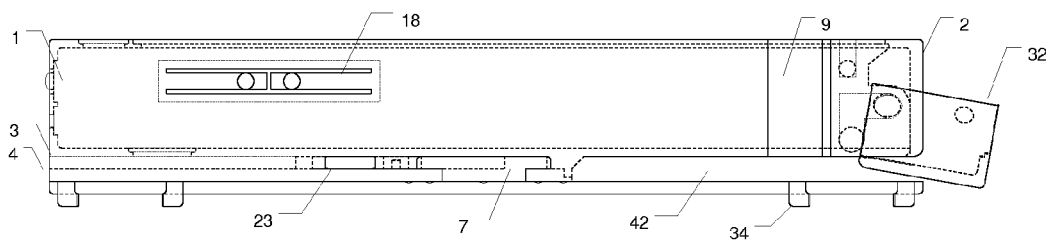

FIG. 2. 2D Front View of the shell and base anchored, without anti-rain protection.

Figure 3:
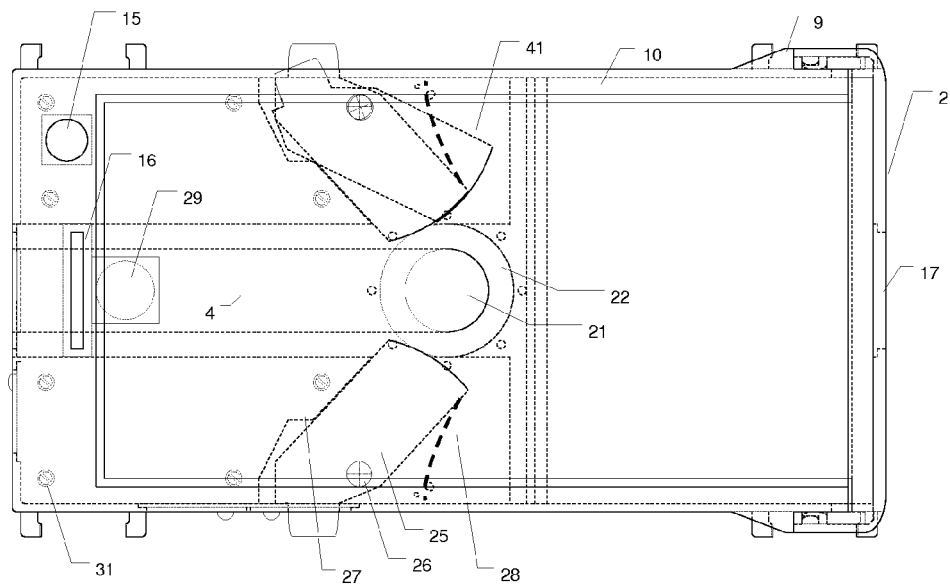

FIG. 3. 2D Plan View of the shell and base anchored, without anti-rain protection.

Figure 4:
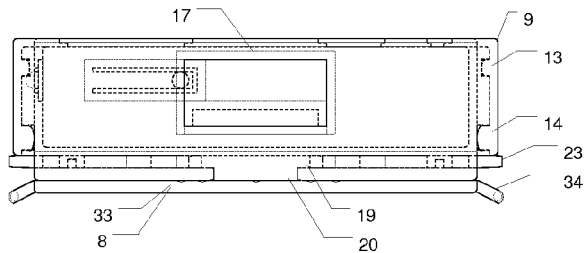

FIG. 4. 2D Side View of the shell and base anchored, without anti-rain protection.

Figure 5:
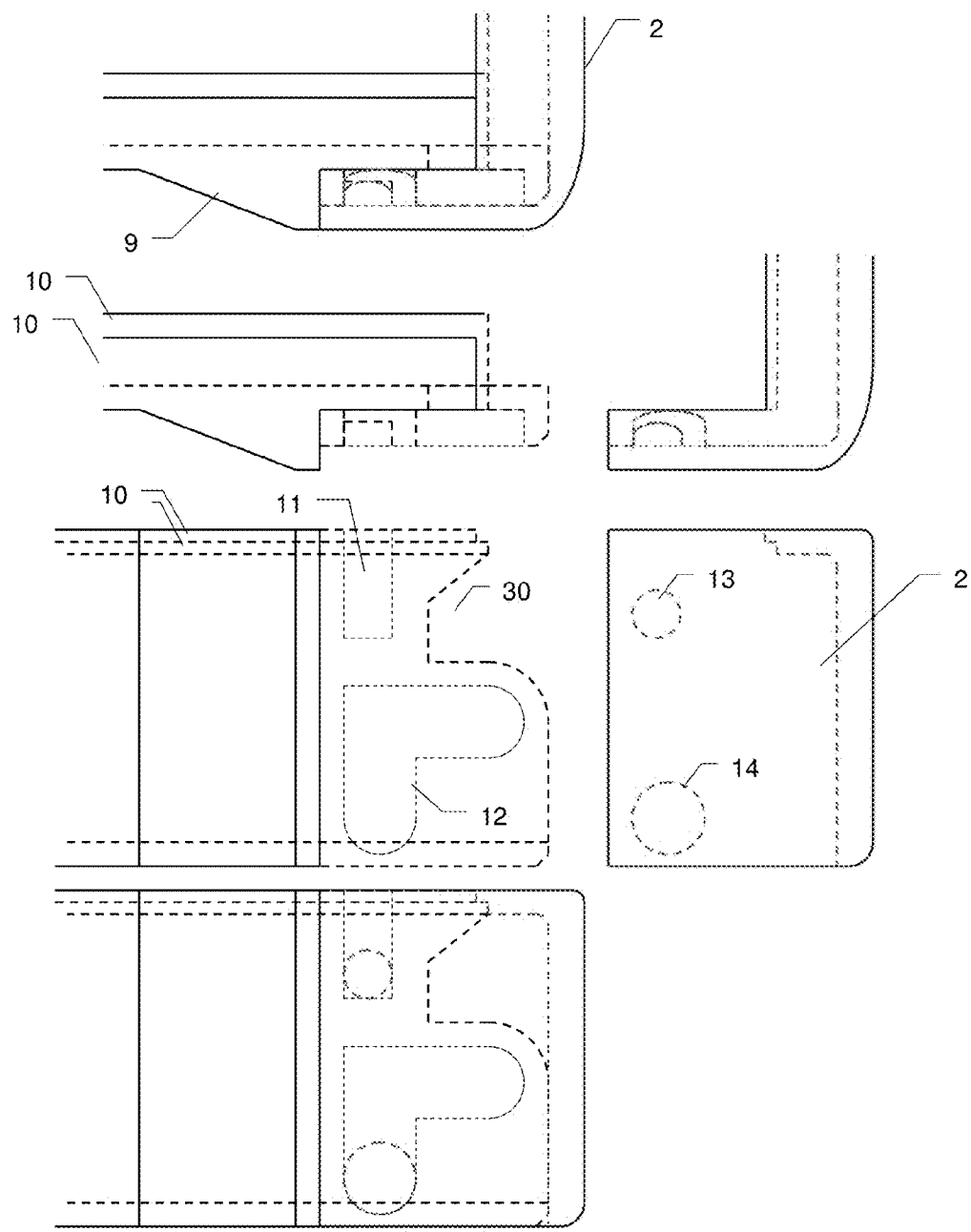

FIG. 5. 2D Detailed Front and Plan view of closing system. The shell and the closing piece can be seen separately, without anti-rain protection.

Figure 6:
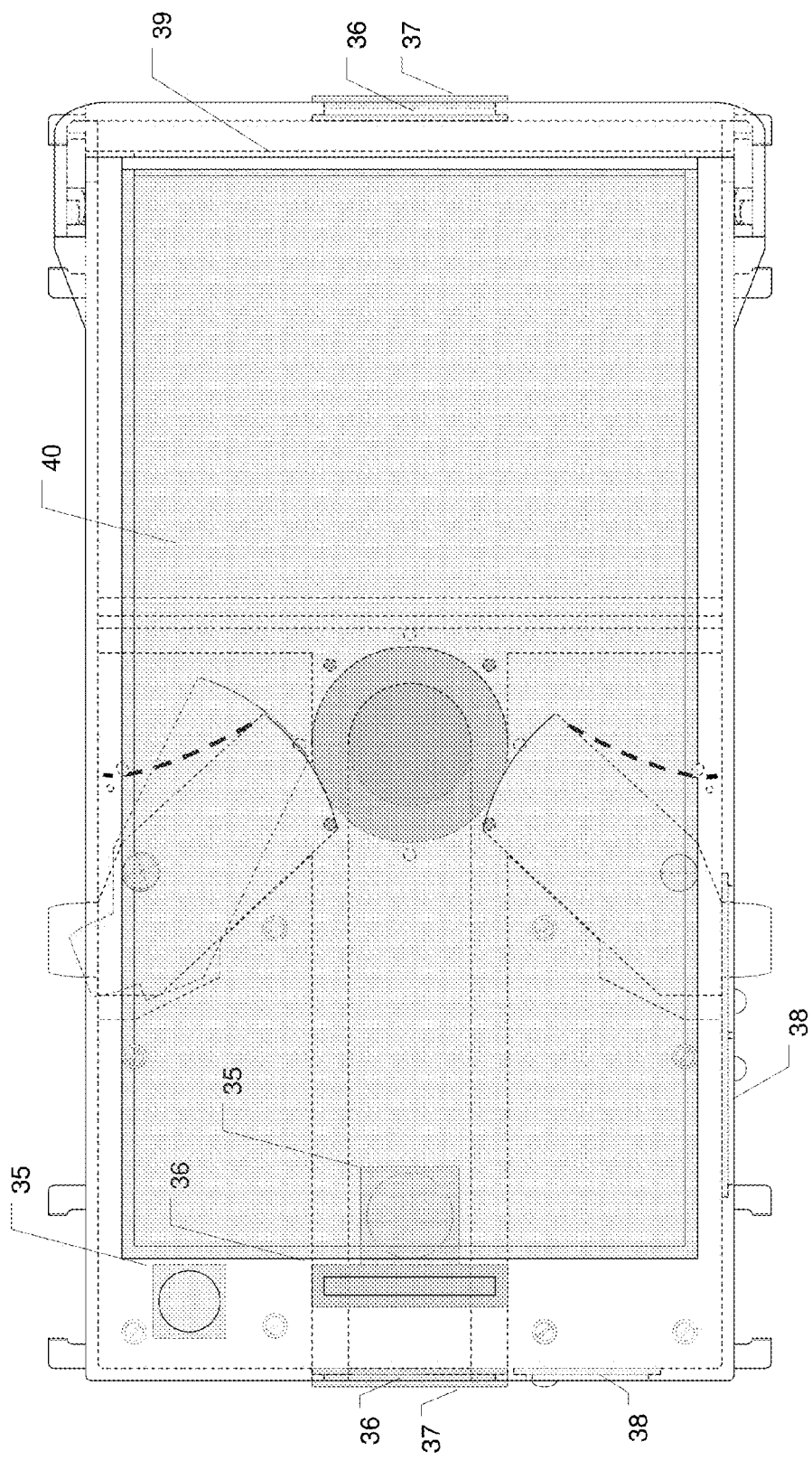

FIG. 6. 2D Plan View of the shell and base anchored, with anti-rain protection.

Figure 7:
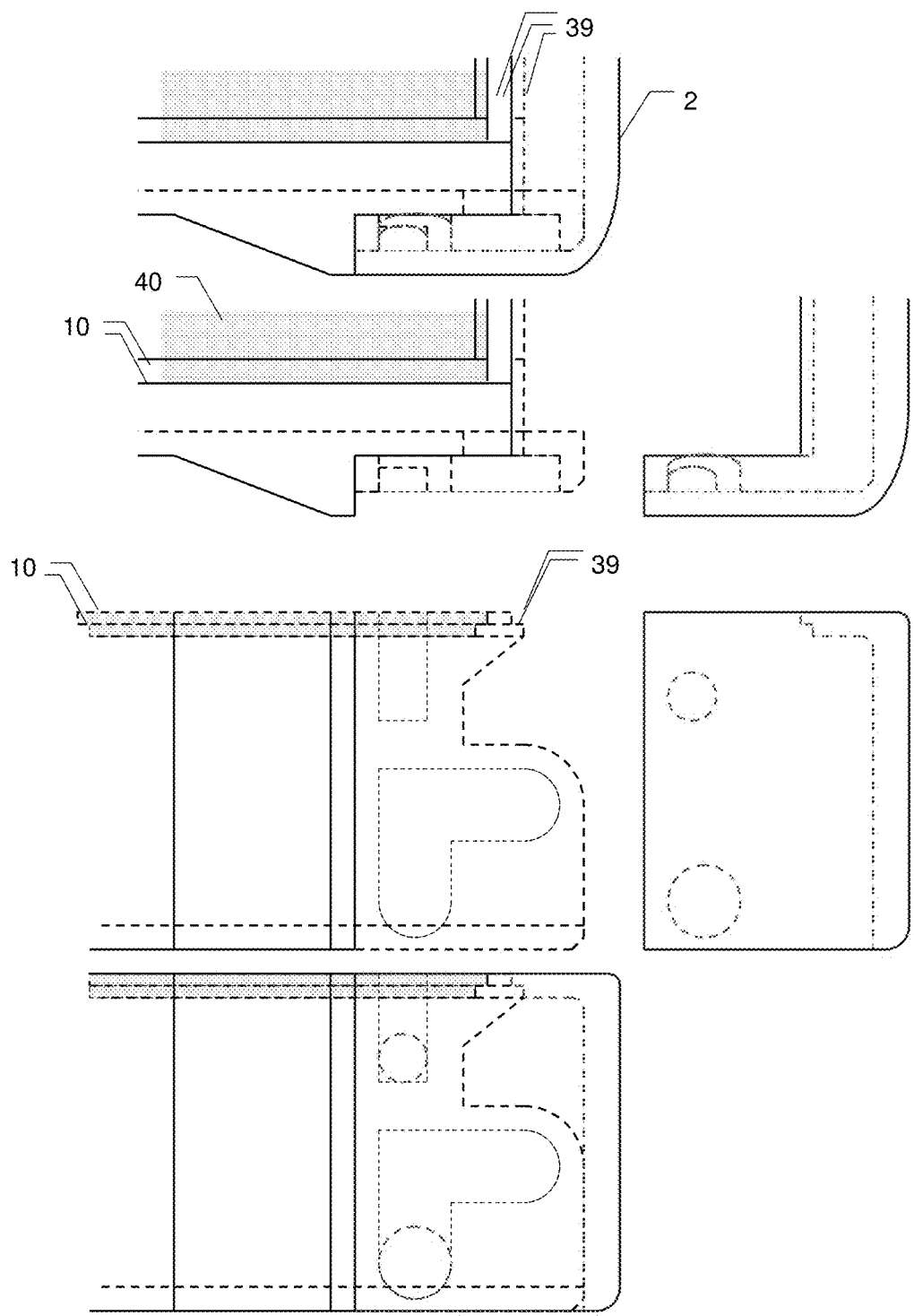

FIG. 7. 2D Detailed Front and Plan view of closing system. The shell and the closing piece can be seen separately, with anti-rain protection.

BEST EXECUTING METHOD

This invention has been designed as described so as to be effective with different types of devices, like one-body devices, or two-body devices. In this latter case, one of the parts work as the cover for the other one, thus opening over it in a sliding or hinge-way manner, inasmuch as the clasping point of the two parts is located more inwards and away from the wider external overhang that covers the perimeter of the top side of the basket. The basket, with this overhang, keeps in place the bottom part, thus enabling the top part to freely open and serve as its cover at the same time.

With several parts added, which are not actually mandatory for the invention to be successful, a substantial advantage can be obtained, since the basket could become a watertight compartment against rain, dust and nitre, while being permissive to sound pass, as well as to an exchange of hot air from the inside to the outside. However, these added parts would not allow the user to slide the device cover open if it is of the two-body type, unless the device is previously removed from the holder.

Therefore, we will proceed to give the details without the anti-rain protection feature, thus saving for later on the explanation of the alterations to be made in order to achieve such a protection.

In an attempt to show in a comprehensible way the invention, we shall describe, in detail, a holder for a one-body rectangular cell phone. Strictly abiding by this, a description of the wrist-holder is given, since it must correspond to the measures and layouts of the specific device contained therein, although the essence of the invention itself, as well as of its workings, are valid for a variety of devices, regardless of shapes, sizes or types.

In short, we have taken one of the so-called smart phones, equipped in such a way as to be useful to us in understanding some parts of the drawings or descriptions we have provided: touch screen, technology for showing information on screen vertically or horizontally adapted, voice dial, 2 cameras, 2 speakers, microphones, volume keys, a shared port for charging tasks, data exchange wiring, and free hand wiring, as well as a cell pointer for a precise knotting down.

By means of two pairs of belts (6), a base, usually rectangular in shape (5), is attached to the wrist of the user. Such base has a circular coupling on its approximate geometric center (7), rising as a protuberance which, as seen from above, presents itself as a circular shape, while from a lateral view takes a mushroom-like shape. That is to say, a stem (21) that connects the base with a flat circular surface placed above the stem, with a slightly bigger radius than the stem itself. From now on, we will refer to this wider piece of the circular coupling as "mushroom head" (22). Both pairs of belts are similar to those of a watch, with the difference that ours will use hook and loop material instead of punctures, in order to the user can adjust more precisely the desired clearance. These belts are attached in pairs on each longitudinal side of the rectangular base by means of couplings (34).

It is the base itself fastened by the belts that actually accounts for the anti-radiation protection, provided by it in a horizontal plane and parallel to the user's wrist and the electronic device which is placed between them. The base is actually composed of three parts: the first one has a circular coupling and the rectangular base, but on its lower side it has a molding-like shape so that an iron layer could be placed inside it which, in turn, could be walled up by a plastic layer which is to join the first of such parts.

The circular coupling (7) of the base will be coupled to the other main element of the invention, a normally rigid shell capable of holding the electronic device to be carried. This shell although is a joined element for be handled as a single unit, is actually composed of two parts or heights. The upper part is a sort of basket (1) which will hold the electronic device itself, and the lower part (3) will be responsible for serving as the mechanism that couples and uncouples the circular coupling of the base. Each part is composed of two elements, one on top of the other, assembled by means of bulges (31), or any other effective means.

The process is accomplished by sliding the circular coupling (7) of the base along a slit (4) especially designed for this purpose, and which is located on the lowermost part of the shell.

Such a slit starts out from one of the longitudinal ends and ends halfway the shell's length, always on the same vertical plane. It comprises a hollow rail on its lowermost part (20) along which the stem (21) of the circular coupling will move, and another flat hollow, slightly wider (19) than the rail for the stem, and both communicated giving shape to the hollow slit bearing the same "T" or mushroom-like shape.

The coupling system comprises two sets of symmetrical parts, both located on each side of the rail into which the circular coupling enters, in the furthermost part of it. Such sets are located in the same vertical plane as the mushroom head (22) since they will operate on it. Each set comprising:

An elongated piece (25), substantially rectangular and asymmetric, having a hole to be filled by a protrusion of the lower part of the basket thus becoming a turning point (26) and allowing the piece to tip around itself. Such turning point must be close to the shell wall and to its transversal axis, but always away from the transversal projection of the mushroom head, already in place at the end of the rail. We can henceforth refer to this piece as the "coupling piece" (25). One of its ends has a rectangular button-like shape (23), of a small size, which protrudes from the shell through an opening and which is meant to be activated by the user. The other end has an arch-like shape (24) corresponding to the turning radio likely to be made by such a piece, (25) provided its hole (26) is taken as the center of a circumference with enough radio so as to make it tangent to the mushroom head, and provided it has been previously located at the end of the rail length. The standstill position of this piece must be in such an angle as to longitudinally point to the circular coupling to prevent it from making the whole piece to oscillate and set the rail free.

A torsion spring (28) which by means of being attached to a pair of protrusions on the bottom side of the basket, actually makes the coupling piece remain in standstill position.

An extended protrusion (27) on the bottom side of the basket which reduces the turning range of the coupling piece, leading to the following 2 scenarios:
—establishing the standstill position when the coupling piece is not actuated by the user —establishing the maximum gyration when it is actuated.

The coupling system mechanism is as follows:

Let us start by saying that the base and the basket are separated and we want to anchor each other. This being the case, the coupling piece must be in a standstill position, as a result of the torsion spinning action, thus we will have one end exposed outward from the shell and part of the other end protruding over the rail of the circular coupling, more exactly at the same level of the coupling's head. By bringing and sliding the circular coupling into the rail, the former should find in its way one extreme of the coupling piece and that upon being pushed makes the whole coupling piece to tip (41) thus overcoming the moderate resistance of the torsion spring, and in so doing frees the way for the circular coupling at the furthermost part of the rail part. Just by clasping into position at the end of the rail, the mushroom head allows the curved part of the coupling piece to tip back to its standstill position and end up again on the path of the coupling head, but this time, and due to the angle of the coupling piece in its standstill position, prevents the circular coupling from starting its way out of the rail, thus remaining safely anchored.

It is worth noting that this is a two-fold process since there is an identical set of pieces on each side of the rail. The reason for this is prevent that an accidental pressing of a button could actuate the uncoupling mechanism.

The base has a series of 8 small carvings (8) with a semi-circular shape arranged around the circular coupling for the purpose of being filled by 4 small protrusions (33) of the bottom side of the shell, depending on the rotation angle of the basket at a given time. Although rotation is free at 360°, such carvings and protrusions contribute to setting the rotation at angles multiple of 45°.

Therefore, the space reserved for the coupling mechanism (3) covers only half of the available surface between the base (5) and the basket itself (1), leaving the other half useless, neither to be used nor covered, but let free and in a vertical discontinuity (42) between the base and the basket.

On the upper side is the basket which should shelter the electronic device, a sort of a hollow box, rectangular in shape and lacking one of its transversal walls for the sole purpose of introducing and taking out the device. At such side, another moveable piece will be set (2) capable of closing the basket in which the device is to be contained and transported. We can refer to this piece as "closing piece". Such a box has other openings but none of these is big enough for the device to be taken out. The biggest of them is located on the upper side of the basket and is fully exposed, wide open, but for a small ledge (10) that goes around the entire perimeter. This ledge is actually an upper overhang of each one of the walls towards the inside of the box. The following openings are meant to activate or provide access to certain keys, speakers, cameras, connectors (ports) or any other element of the device the access of which might be useful and possible through them; therefore, depending on the device model, such opening may vary in number or, even in particular locations, different from the ones we are to describe bellow.

On the top side, in addition to the bigger opening mentioned above, there are another 2 openings, a rectangular-shaped one for a speaker (16) and a circular one for a secondary camera for videoconferences. On the side opposite the open extreme for introducing and taking out the device, is an opening for another speaker (16) and an overbutton (18) to operate the on-off key. This "overbutton" is actually a sort of cutting on the box wall, which matches the real shape of a device key, except on one of the ends, since it works as the joining point to the rest of the box wall; in addition, there is a small semicircular protrusion on that part of the overbutton where the pressing may be most effective; therefore, that area of the wall is more flexible to be pressed more easily on the real key of the device that would otherwise be more difficult to press, due to its reduced dimensions. On one of the longitudinal walls, are two overbuttons meant to operate the keys to increase or lower the device volume. On the bottom side of the basket is a circular opening (29) that coincides with the main camera of the device as well as with the slit of the circular coupling, thus enabling the user to use the camera by simply removing the basket from the wrist and not actually taking the device out of the basket. On the wall that is a part of the closing piece, there is a rectangular opening (17) for data connection or battery charging, in addition to microphone connections.

The mechanism for introducing and taking the device out comprises a number of elements located in the basket and others located in the closing piece. We could first of all notice an outward widening (9) of the longitudinal walls of the basket, at the open extreme of it. Each widening has two cleavages, one which is not penetrating the widening and, seen from a longitudinal side, has an L shape (12) rotated 90° clockwise, also lacking any openings on its path. It will serve as the rail for a stem located on the closing piece and henceforth called "rotating stem". The other cleavage also is not penetrating the wall and, seen from a longitudinal side, is vertical (11), short in length with its origin open on the uppermost part, with no other opening ending its path without reaching the other cleavage. It will serve as the rail for a stem located on the closing piece, henceforth called "closing stem". Such widenings, and the walls being part thereof, seen from a longitudinal side, do not actually have the shape of a complete rectangle, so as to abide by the projection of the device which they contain, but rather, thanks to a cutting on their distal uppermost end, (30) have a different shape thus making a part of the device visible and accessible.

The closing piece (2), as seen from an upper plane, has a brace-like shape "]", each short side of which functions as the coupling of the basket on the ends of each longitudinal wall; it will be joined by means of the closing (13) and rotating (14) stems, each in its corresponding cleavage on the widening of the box. The longest side of such a brace serves as the wall that is to close up the box and safely keep the device inside.

The mechanism works as follows: provided the holder is closed in the horizontal plane, upon pulling this closing piece (2) upward, the closing stem (13) is out and free, which formerly prevented any other movement of the piece, even a rotating one. The vertical path of the piece is the same as that one defined for the rotation rail (12); once it goes all the way up, the driving maneuver of the piece in the horizontal plane is started, having the same horizontal path in the way as that one defined by the rotation rail. At the end, rotation is thus started thanks to the round shape of the rotation stem (14) and to the round shape of the end of the rail where it is located. Upon rotating, the wall of the closing piece, which was formerly in a vertical position, goes just below the box's base which in turn has a small slanted cutting, for this sole purpose of rotating, to end up being partially hidden and in a horizontal (32) position within the existing space (42) between the basket and the base. In so doing, the structure of the closing piece has withdrawn all its components along the way, thus allowing for the introducing and taking out of the device from the holder, and due to its shape, itself serves as a guide to facilitate the operation.

With several parts added, which are not actually mandatory for the invention to be successful, a substantial advantage can be obtained, since the shell could become a water-tight compartment against rain, dust and nitre, while being permissive to sound pass, as well as to an exchange of hot air from the inside to the outside. However, these added parts would not allow the user to open or slide the device cover if it is of the two-body type, unless the device is previously removed from the holder.

The alterations to be made in order to make it water-tight are as follows:

Each opening intended for a camera has a small engraving around it on the inner side of the basket to be safely plugged by means of a transparent and rigid plastic (35) which will be attached to the box by ultrasonic techniques.

Each opening intended for a overbutton has around all its perimeter a small engraving on the inner side of the basket to be safely plugged by means of a flexible plastic (38) attached from inside the box by ultrasonic techniques.

Each opening for a speaker, microphone or data connector has a small engraving around it on the inner side of the basket to be safely plugged by means of an expanded polytetraflouroethylene membrane (36) with a microporous structure capable of allowing sounds to pass both ways, as well as an exchange of hot air from the inside to the outside, while preventing water, dust and salt crystals from getting through. Such a membrane will be fixed from the inner side of the box by ultrasonic techniques or manually, provided it has previously been prepared for such a purpose, in addition to being protected by means of a metallic grill (37), pressure-couched, from the external side of the opening.

Into the upper side of the basket, formerly wide open except on an engraved perimeter overhang, a crossbar (39) will be added, actually attached by ultrasonic to the origin and end of the above-mentioned overhang ledge offered by the 3 fixed walls of the shell. Such crossbar will work, toward the interior of the shell, as the ledge of the transversal wall that is missing, and will also serve as a ledge to the closing piece in its closing position by providing support to it. Finally, by means of ultrasonic techniques, a transparent semi-rigid plastic will be fixed, from the external side, to the whole ledge, the crossbar included, which will allow for operating the touch screen with sensitivity, as needed.

INDUSTRIAL APPLICATIONS OF THE INVENTION

Aspects embodied in this invention offer benefits to whichever industry where mobile phones or PDAs are used by providing users with a much healthier and comfortable transportation and handling system.

Additionally, if the device incorporates a free-hands system, the wrist holder can be used without an external apparatus to attach it to, especially while driving, since the driver's wrist is close enough for allowing him to have an effective communication.

It is also worth-mentioning that the device to be transported may have another type of application, such as those used for medical control or medication, GPS systems for pedestrians, etc, resulting in a tremendously wider range of industrial applications.

I claim:

1. A wrist holder for transporting and using electronic devices, particularly suitable for communicating, processing and data-storing devices, such as mobile telephones, PDA, smart phones, microcomputers, GPS systems, external hard drives, electronic storing memory devices, audio and/or video players, medical devices for the control and measuring of medication, and in general, for whichever device or object that, upon being carried on the user's wrist may be considered useful or comfortable, that is characterized for offering an anti-electromagnetic radiation protection and for comprising two main elements which may be anchored or unanchored between them when the user wishes, wherein:
    a) the first of such elements is the base of the holder, called henceforth base, and will be attached to the wrist of the user by means of belts; such a base has, among other elements, a circular protuberance that works as a coupling element presented vertically, and likewise, thanks to a metallic layer found in the interior of the base, the area around the wrist is additionally given an anti-electromagnetic radiation protection; and
    b) the second is a grouped element, called henceforth shell, that is handled as a single piece, although two levels or heights in it, docked each other during assembly, are worth-mentioning: b1) the upper one is a sort of hollow box that is endowed with engravings for become watertight, and in addition allows the user to use the electronic device while it is inside by means of openings either covered with plastic or not covered, which may be called henceforth the basket, and which has, among other elements, a closing piece at one of its ends that is a part of the system for introducing or taking out the device, and b2) the lower one, is an area for the coupling mechanism, which presents a T-shaped opening in its lower plane and is responsible for serving as the mechanism to couple with the coupling formerly offered by the base, having an automatic anchoring system by means of springs and a manual dual drive system for uncoupling by means of two sets of symmetrical parts to prevent uncoupling by accidental blows.

2. The wrist holder particularly suitable for the devices in accordance to claim 1, is characterized for having an attachment system to the wrist, which in turn is characterized because:
    a) two pairs of belts, with crimp and look similar to those used for watches, are used in order to provide the holder stability as well as to avoid undesirable movements; and because
    b) the couplings for the crimps are located two by two at each longitudinal side of the base, provided it has a rectangular shape, and symmetrically located two by two in case the base does not have a rectangular shape; and because
    c) such belts will have strips of hook and loop material or similar material, for proper adjusting and attaching, thus allowing the user to comfortably and safely transport the device, and the materials of the belts may vary, such as leather, plastic, aluminum, stainless steel, or others.

3. The wrist holder particularly suitable for devices in accordance to claim 1, is characterized for having a base, to be attached to the wrist of the user, which in turn is characterized because:
    the dimensions and shape of the base will be similar to those projected by the device when seen from a plan view and when securely placed in such a way that its main control components are placed facing up and to the sides, thus, if the bottom side of the devise is flat or almost flat, the holder base will be flat, or on the other hand, if the bottom side of the device is curved, the holder base may have the same curvature, or a similar one, provided that it better fits the wrist's natural shape, and therefore the holder base will be flat and rectangular for the vast majority of devices; and because
    the base has a coupling on its approximate geometric center, which, as seen from above, presents a circular shape, while from a lateral view, takes a mushroom-like shape, that is to say, a stem that connects the base with a flat circular surface of slightly bigger radius than the stem itself, being the circular shape of the coupling the main feature that allows to serve the following main functionalities: 1) the joint between the base and the basket that shelters the device, and 2) the easy rotation of the basket that shelters the device, while keeping the basket anchored to the base; and because
    the base and coupling are two parts hypothetically divided from a single real piece that comprises three parts: a) the first one is made of polycarbonate and offers the circular coupling and the base, commonly rectangular, and b) the whole surface of its bottom side presents a carving shape, with the exception of a peripheral edge which allows placing a thin stainless metal sheet in the carved space, which in turn will be sandwiched with c) another polycarbonate sheet which will be joined to the first piece edge during assembly.

4. The wrist holder particularly suitable for devices in accordance to claim 1, is characterized for having an anti-electromagnetic radiation protection, which in turn is characterized for:
    it is located in the interior of the base and is made of a thin seamless, unsealed, and jointless stainless metal sheet like can be type 1.4310 stainless steel; and for
    it provides protection to the area closest to the user and in continuous contact, that is to say the wrist, in a horizontal plane, parallel to the wrist of the user and the electronic device, interposed between them; and for said protection has been placed on the base, slightly separated from the device so as to facilitate its communicative effectiveness, as well as to prevent an excessive isolation.

5. The wrist holder particularly suitable for devices in accordance to claim 1, is characterized for having a coupling mechanism between the base and the shell, which in turn characterizes itself for the following facts:

the shell is coupled with the base thanks to a circular coupling that is offered vertically by the base and which will come through the hollow T shaped rail of the shell and its lowermost side, that is to say, into the area of the coupling mechanism; and for the path of the rail starts out from one of the ends of the longitudinal axis of the bottom side of the area of the coupling mechanism, and goes along, driven by the axis itself, and in the same horizontal plane, the necessary distance so as to allow the circular coupling to be finally connected at the middle point of the shell, being the end of the path completed with semicircles that fit perfectly with the stem and the head of the circular coupling; and for the system comprises two sets of symmetrical parts, both located at each side of the rail and very close to the final part of the path, being such sets located on the same vertical plane as the widest part of the circular coupling, called henceforth mushroom head, so as to act upon it, comprising each set:

an elongated piece, substantially rectangular and asymmetric, called henceforth coupling piece, which has a hole to fit with a protrusion of the lower part of the basket thus becoming a turning point (26) and allowing the whole coupling piece to tip, being said turning point close to the shell wall and to its longitudinal axis, but always away from the transversal projection of the mushroom head when is located at the end of the rail, and furthermore one end of the coupling piece is button-shaped, of a small size, which protrudes from the shell through an opening and which is meant to be activated by the user, while the other end has an arch-like shape corresponding to the turning radio likely to be made by such a piece, provided its hole is taken as the center of a circumference with enough radio so as to make it tangent to the mushroom head, provided it has been previously located at the end of the rail length, to ensure that the standstill position of coupling piece is in such an angle as to longitudinally point to the circular coupling to prevent it from making the whole piece to oscillate and set the rail free; and a torsion spring which by means of being attached to a pair of protrusions on the bottom side of the basket, actually makes the coupling piece remain in standstill position; and a protrusion on the bottom side of the basket which reduces the turning range of the coupling piece, leading to the following 2 scenarios: establishing the standstill position when the coupling piece is not actuated by the user, or establishing the maximum gyration when it is actuated.

6. The wrist holder particularly suitable for the devices in accordance to claim 1, is characterized for having a system that allows the rotation of the shell while still anchored to the base, which in turn is characterized for:

a circular coupling which due to its shape is capable of rotating freely at 360°; and the incoming rail for the coupling mechanism, which due to its T-hollowed shape and semicircular shape at the end of its path allows for a free rotation of 360°; and 4 slight protrusions of the bottom side of the shell with a semicircular shape to be matched with some of the existing carvings in the upper side of the base, for the purpose of slightly fixing the rotation at those angles multiple of 45°, although the user may stop such rotation at any other angle; and 8 small carvings on the upper side of the base, with a semicircular shape which would match with the protrusions of the bottom side of the shell, with the purpose of slightly fixing the rotation at those angles multiple of 45°, although the user may stop the rotation at any other angle, likewise these carvings are located conforming a circle shape, every 45° of said circle shape.

7. The wrist holder particularly suitable for devices in accordance to claim 1, is characterized for having a system for introducing and taking out the device, which in turn is characterized for:

the hollow box, henceforth the basket, of claim 1, normally rectangular in shape, wide open and without crossbars on its upper side, but for a peripheral ledge which is actually an open overhang of each one of the 3 walls on the inside of the box, while it lacks one of the transversals walls for the purpose of introducing and taking out the device from that side, and furthermore longitudinal walls have a substantially rectangular shape as seen from the front, but on the edges closer to the missing wall, they have a cutting on their furthermost and uppermost side, making part of the device visible and accessible so it can be easily grabbed and pulled out after it has been put inside the holder; and having the basket at the edges closer to the missing transversal wall, some widenings of the longitudinal walls for the purpose of carving into them, on the outer side, two rails, wherein from a front view, one of them, called the closing rail, can be seen as located on the upper side of the widening, with his only start there, and going vertically downward by the outside, ending its path without reaching the other rail, and the other one rail, called rotation rail, wider than the former one, has an L-shape, rotated 90° clockwise, and has no openings at any point of its path; and a moveable closing piece, which crimped to the basket and conveniently rotated by certain movements, is left positioned in such a way as to allow the basket to safely keep the device inside. In turn, this piece is characterized for:

having 3 vertical walls the same height as the basket walls, with the same overhang, completing the elongation of the ledge of the upper side of the basket, and for having a bracket shape "]", as viewed from the plan view, and each short side of this bracket serves as the coupling area of the widenings of each longitudinal wall of the basket, while the longer side of the bracket serves as the missing wall of the box in order for it to be properly closed and keep the device safely inside, and for having on each side of its walls, 2 protrusions shaped like rounded cylinders on the tips: the first is called closing stem, located on the upper third of the wall, and the other one is called rotation stem, located on the bottommost part of the wall, and is slightly bigger in diameter than the closing stem, and for coupling with the shell, by way of using the closing and rotation stems, each one running along its corresponding slit at the widening of the basket, and for having a slightly elastic coating to ensure that once fitted all round contact with the basket, will prevent any liquid from getting inside the basket through the contact surface.

8. The wrist holder particularly suitable for devices in accordance with claim 1, is characterized for having openings that allow the use of the main controls of the device, once it is lodged in the holder, but none of these openings allow the extraction of the device, wherein said openings comprise:

a circular opening where there is a camera; and a cutting on the box wall where some button of the device can be allocated, called henceforth overbutton, which matches all or part the shape of the device button, except on one of the ends, since it works as the joining point to the rest of the box wall, having in addittion, a small semicircular protrusion on that part of the overbutton where the pressing may be most effective and therefore, that area of the wall is more flexible to be pressed more easily on the real key of the device that would otherwise be more difficult to press, due to its reduced dimensions; and an opening where there is a speaker, microphone or port, with substantially the same shape of such speaker, microphone or port. In case there are more elements in close proximity, the openings can be gathered into one that covers all of the elements, and a big opening comprising actually the upper face of the basket, with the exception of a perimeter ledge, that is actually an upper overhang presented by each one of the walls towards the interior of the basket, coinciding this opening with the device's screen and/or the control elements that may be on this face.

9. The wrist holder particularly suitable for devices in accordance with claim 1, is characterized for having the pieces ready for placing elements that offer a protection to the basket against dust, nitre, and water, while allow the passage of voice and sounds, as well as the exchange of hot air from the inside to the outside, comprising:

each opening intended for a camera has a small engraving around the inner side of the basket, if is desired to fix a transparent rigid plastic to it; and each opening intended for an overbutton has a small engraving around the inner side of the basket, if is desired to fix a flexible plastic to it; and each opening intended for a speaker, microphone or port has a small engraving around the inner side of the basket, if is desired to fix an expanded polytetraflouroethylene membrane of microporous structure, which allows for the passage of sound in both directions and the exchange of hot air from the inside to the outside, while preventing the passage of water, dust and salt crystals from the environment to the inside; and the big opening comprising the upper face of the basket, with the exception of a peripheral ledge that is actually an upper overhang presented by each one of the walls towards the interior of the basket, has a small engraving by the upper face of ledge around the inner side of the basket which serves two purposes: 1) to fix a crossbar if is desired to link both longitudinal sides of the ledges through the widenings area, having this crossbar also a ledge so, once in place through the transversal wall, it provides support to a basket's closing piece, and 2) to fix a semirigid plastic if is desired to cover the entire opening of the upper face, while allowing the activation of the screen and/or the control elements with appropriate sensitivity.

10. The wrist holder particularly suitable for devices in accordance with claim 1, is characterized for having at least a vain space between the base and the basket that is not used and is not covered but is left free remaining a vertical discontinuity between the base and the basket. The goals are mainly but not only, to be able to accommodate the sleeve's cuff or another article of clothing in case of this cloth does not allow to cover the whole holder over it, and to allow accommodate the moveable closing piece of the basket when it is in the open position.

\* \* \* \* \*